United States Patent
Gyllenskog et al.

(10) Patent No.: US 12,282,684 B2
(45) Date of Patent: Apr. 22, 2025

(54) TECHNIQUES FOR CONTROLLING COMMAND ORDER

(71) Applicant: Micron Technology, Inc., Boise, ID (US)

(72) Inventors: Christian M. Gyllenskog, Meridian, ID (US); Luca Porzio, Casalnuovo (IT)

(73) Assignee: Micron Technology, Inc., Boise, ID (US)

( * ) Notice: Subject to any disclaimer, the term of this patent is extended or adjusted under 35 U.S.C. 154(b) by 239 days.

(21) Appl. No.: 17/654,536

(22) Filed: Mar. 11, 2022

(65) Prior Publication Data

US 2023/0289094 A1    Sep. 14, 2023

(51) Int. Cl.
    *G06F 3/06* (2006.01)
(52) U.S. Cl.
    CPC .......... *G06F 3/0659* (2013.01); *G06F 3/0611* (2013.01); *G06F 3/0679* (2013.01); *G06F 2212/7209* (2013.01)
(58) Field of Classification Search
    CPC .... G06F 3/0659; G06F 3/0611; G06F 3/0679; G06F 2212/7209
    See application file for complete search history.

(56) References Cited

U.S. PATENT DOCUMENTS

| | | | | |
|---|---|---|---|---|
| 10,282,103 | B1* | 5/2019 | Stone | G06F 13/24 |
| 2009/0150605 | A1* | 6/2009 | Flynn | G06F 13/28 |
| | | | | 711/E12.001 |
| 2012/0311298 | A1* | 12/2012 | Post | G06F 3/0608 |
| | | | | 711/E12.078 |
| 2016/0216907 | A1* | 7/2016 | Chang | G06F 3/0656 |
| 2020/0327066 | A1* | 10/2020 | Li | G06F 3/061 |
| 2022/0197552 | A1* | 6/2022 | Corbetta | G06F 3/0683 |

* cited by examiner

*Primary Examiner* — Kalpit Parikh
(74) *Attorney, Agent, or Firm* — Holland & Hart LLP

(57) ABSTRACT

Methods, systems, and devices for techniques for controlling command order are described. An entity of a host system, such as a file system, may insert a sequential identifier into commands generated by the entity to indicate an order of the commands. In some examples, the host system may specify a set of commands in a first sequence to be transmitted to the memory system. The host system may subsequently reorder the set of commands in to a second sequence and transmit the set of commands to the memory system. In some cases, following a power-on condition, the memory system may determine a latest valid command of the set of commands. The memory system may subsequently invalidate one or more logical addresses associated with commands having sequence identifiers after the sequence identifier of the latest valid command.

26 Claims, 8 Drawing Sheets

TECHNIQUES FOR CONTROLLING COMMAND ORDER

FIELD OF TECHNOLOGY

The following relates to one or more systems for memory, including techniques for controlling command order.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
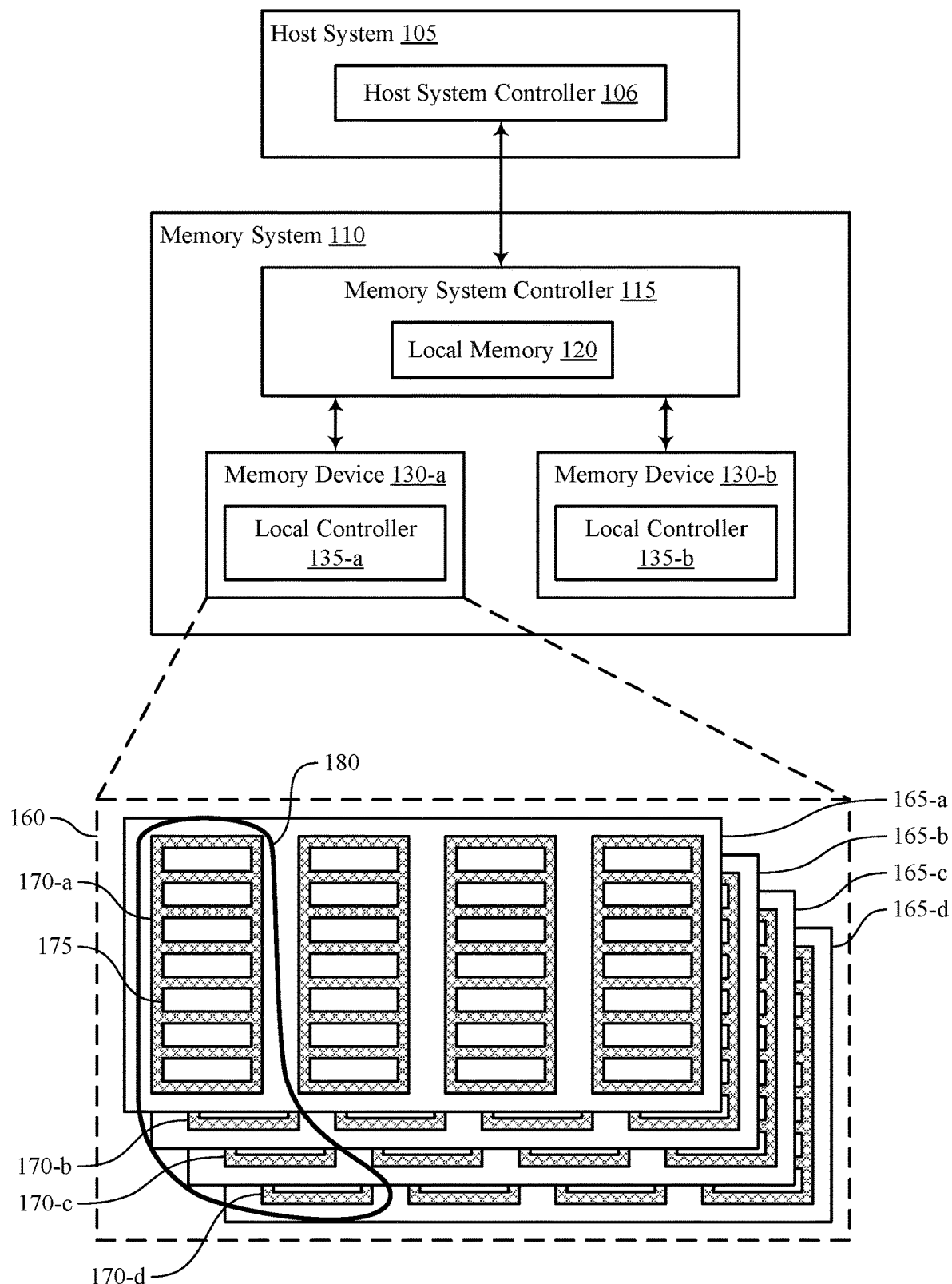
FIG. 1 illustrates an example of a system that supports techniques for controlling command order in accordance with examples as disclosed herein.

A host system may include one or more layers to generate and transmit commands to store data at a memory system. For example, a host system may include a file system which may generate commands in a sequence, such as commands to store data in the memory system, commands to change the location of data in the memory system or file system and so on. However, other layers of the host system may reorder or adjust the sequence of commands. In addition, the memory system may also reorder the sequence of commands received from the host system prior to execution. In some cases, such as if an asynchronous power loss occurs to the memory system and/or the host system, the host system or the memory system may rebuild the file structure using the information stored in the memory system by commands that were executed prior to the power loss. To effectively rebuild the file structure, the host system may use information concerning the ordering of the commands. However, if reordering occurs at the other layers of the host system or at the memory system, the file structure may be corrupted.

In some cases, the file system may issue a synchronization command between a first set of commands and a second set of commands to ensure that the first set of commands are executed by the memory system prior to the second set of commands. The synchronization command may instruct additional layers of the host system to clear out or empty queues for the first set of commands prior to sending any of the second set of commands. However, the synchronization command may be computationally expensive or inefficient due to the time or resources used to clear queued commands. Additionally or alternatively, the host system 305 may insert a barrier command into the commands generated by the file system. The barrier command may instruct the memory system to perform commands received before the barrier command prior to performing commands received after the barrier command (e.g., to not reorder across the barrier command). However, the host system may not be able to ensure that all layers of the host system implement the barrier commands. Thus, using the barrier command may not preserve the order of the commands generated by the file system 315.

As described herein, the file system may insert a sequential identifier with each command in the set of commands generated by the file system. The sequential identifier may be included in a field of each command, and may correspond to a command's position in the sequence of the set of commands. In some examples, the file system may specify a set of commands in a first sequence to be transmitted to the memory system. The host system (e.g., other layers of the host system) may subsequently reorder the set of commands in to a second sequence and transmit the set of commands to the memory system. In some cases, a failure event may occur, and, following a power-on condition, the host system or the memory system may determine a latest valid command to reduce the possibility of corruption during rebuild of the file structure. In some cases, the memory system may attempt to reconstruct the set of commands in order to prevent data loss, for example by determining a latest valid command of the set of commands. In some cases, the latest valid command may correspond to the latest commands of a continuous subset of the set of commands. The memory system may subsequently invalidate one or more logical block addresses (LBAs) associated with commands having sequence identifiers after the sequence identifier of the latest valid command. Additionally or alternatively, the file system may maintain a latest valid command, and issue commands to invalidate commands executed by the memory system having sequence identifiers after the sequence identifier of the latest valid command. Thus, the host system and the memory system may improve responses to failure events, leading to less loss or corrupted data and more efficient operation.

Figure 2:
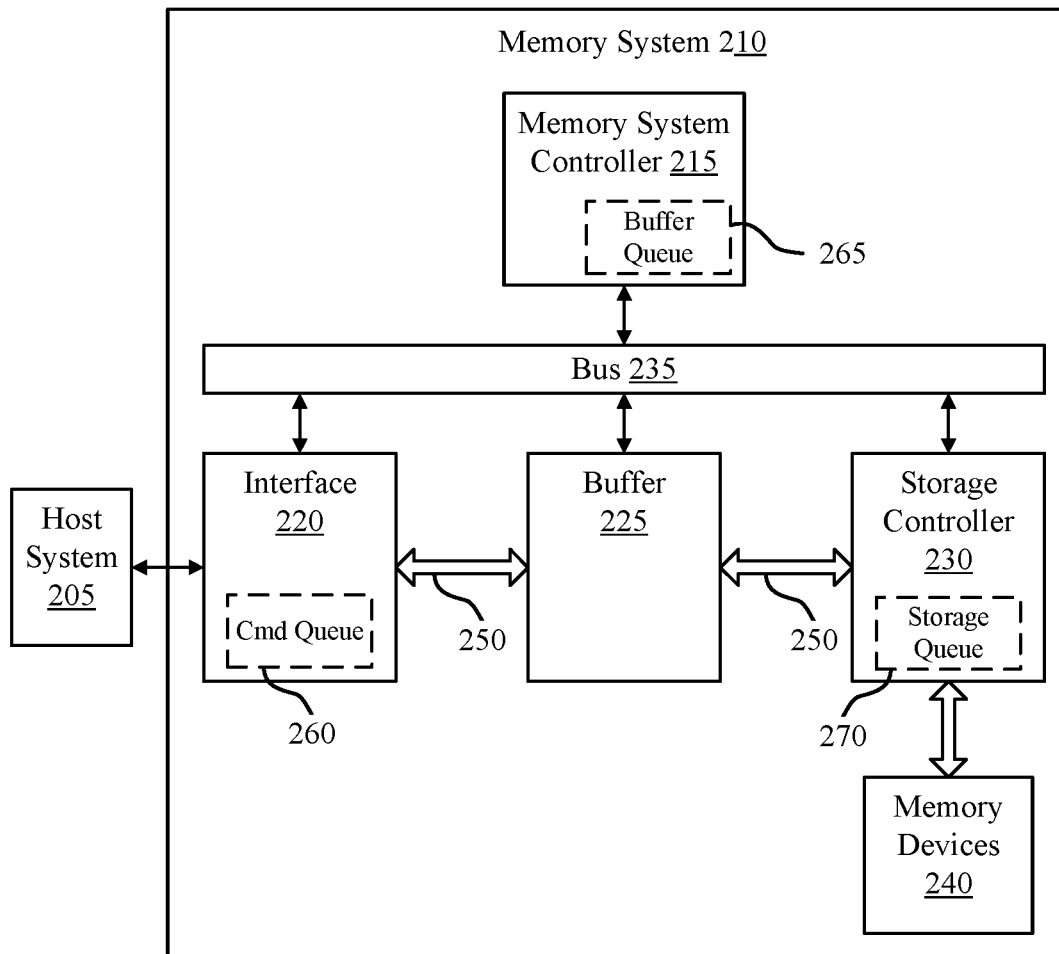
FIG. 2 illustrates an example of a system that supports techniques for controlling command order in accordance with examples as disclosed herein.

Features of the disclosure are initially described in the context of systems, devices, and circuits with reference to FIGS. 1 through 2. Features of the disclosure are described in the context of a system and a process flow with reference to FIGS. 3-4. These and other features of the disclosure are further illustrated by and described in the context of an apparatus diagram and flowchart that relate to techniques for controlling command order with reference to FIGS. 5-6.

FIG. 1 illustrates an example of a system 100 that supports techniques for controlling command order in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), a Universal Protocol (UniPro) interface, and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support techniques for controlling command order. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, a host system 105 may insert a sequential identifier in a set of commands generated by a file system of the host system 105. The sequential identifier may be included in a field of each command, and may correspond to a command's position in the sequence of the set of commands. In some examples, the host system 105 may specify a set of commands in a first sequence to be transmitted to the memory system 110. The host system 105 may subsequently reorder the set of commands in to a second sequence and transmit the set of commands to the memory system 110. In some cases, a failure event may occur, and, following a power-on condition, the host system 105 or memory system 110 may attempt to determine a latest valid command of the set of commands. In some cases, the latest valid command may correspond to the latest command of a continuous subset of the set of commands. The memory system 110 may subsequently invalidate one or more LBAs associated with commands having sequence identifiers after the sequence identifier of the latest valid command (e.g., autonomously or based on commands from the host system 105).

FIG. 2 illustrates an example of a system 200 that supports techniques for controlling command order in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). In some cases, the memory system controller 215 may re-order some commands between the command queue 260 and the storage queue 270. For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some cases, a host system 205 may insert a sequential identifier with each command in the set of commands generated by a file system of the host system 205. The sequential identifier may be included in a field of each command, and may correspond to a command's position in the sequence of the set of commands. In some examples, the host system 205 may specify a set of commands in a first sequence to be transmitted to the memory system 210. The host system may subsequently reorder the set of commands to a second sequence and transmit the set of commands to the memory system 210. In some cases, a failure event may occur, and, following a power-on condition, the host system 205 or memory system 210 may attempt to determine a latest valid command of the set of commands. In some cases, the latest valid command may correspond to the latest command of a continuous subset of the set of commands. The memory system 210 may subsequently invalidate one or more LBAs associated with commands having sequence identifiers after the sequence identifier of the latest valid command (e.g., autonomously or based on commands from the host system 105).

Figure 3:
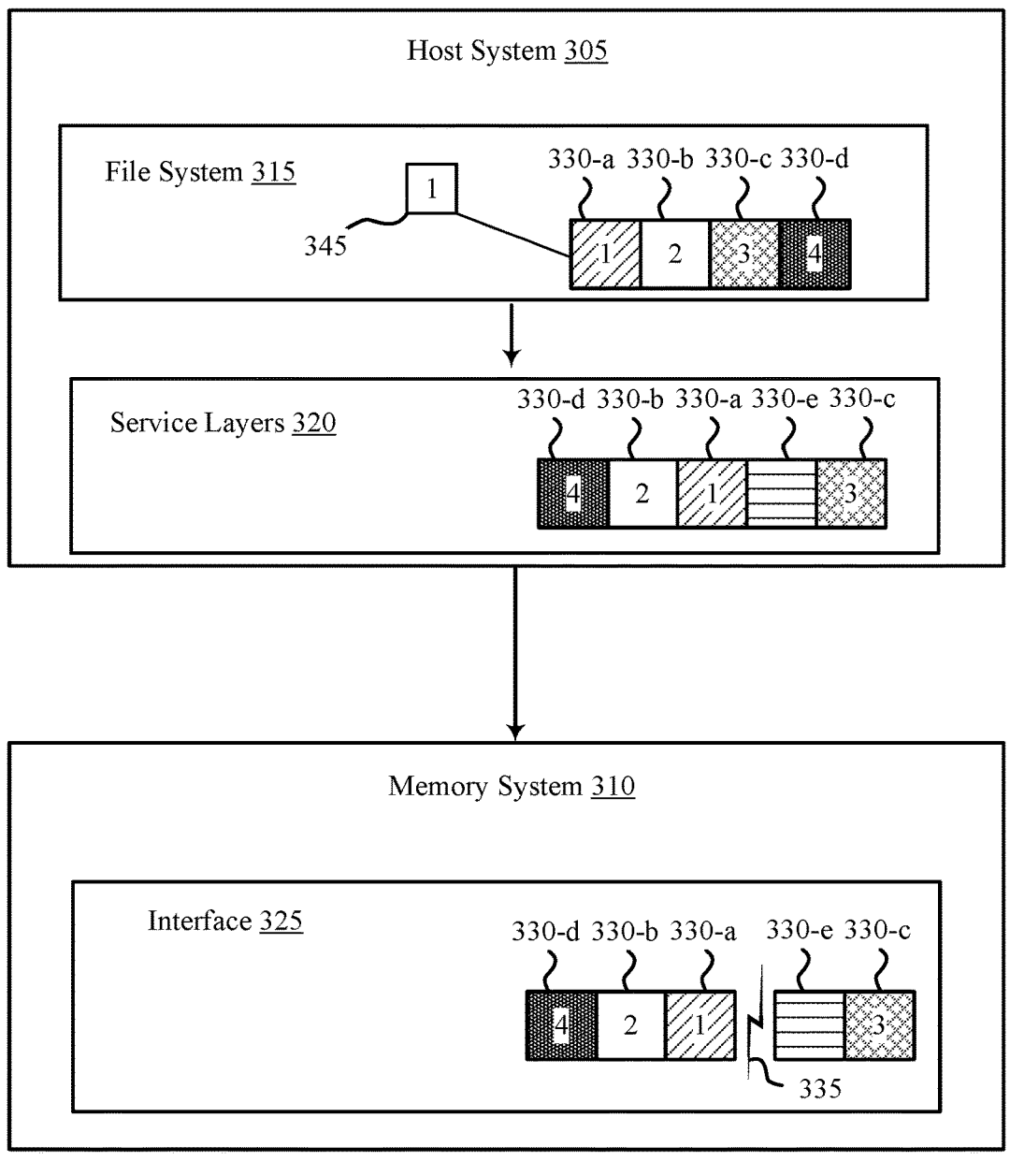
FIG. 3 illustrates an example of a system that supports techniques for controlling command order in accordance with examples as disclosed herein.

FIG. 3 illustrates an example of a system 300 that supports techniques for controlling command order in accordance with examples as disclosed herein. In some cases, the system 300 may include a host system 305 and a memory system 310, which may be examples of the corresponding system as described with reference to FIGS. 1 and 2. The host system may include multiple layers or entities for communication with the memory system 310, such as a file system 315 and service layers 320. In some cases, the memory system may be an example of an MNAND system, and may support UFS commands. Accordingly, the host system 305 may communicate with the memory system 310 using UFS or UniPro signaling, or other signaling used by the memory system 310.

In some cases, the host system 305 may generate and transmit commands to store data or other information to the memory system 310. For example, the file system 315 may generate one or more commands 330, such as a first command 330-*a*, a second command 330-*b*, a third command 330-*c*, and a fourth command 330-*d*. A command 330 may include an indication to store data at the memory system 310 or to read data from the memory system. The commands 330 may include commands related to a mapping of data of a file system of the host system 305. In some cases, the file system 315 may generate the commands 330 in a first order (e.g., according to a first sequence). For example, the file system 315 may generate the first command 330-*a*, followed by the second command 330-*b*, followed by the third command 330-*c*, followed by the fourth command 330-*d*.

Prior to being transmitted to the memory system 310, the commands 330 may undergo additional processing or adjustments, for example by passing through service layers 320 of the host system 305. In some cases, the service layers 320 may include one or more layers, such as a block device layer (e.g., an input/output (I/O) scheduler), a universal flash storage host controller driver (UFS HCD) layer, a small computer system interface (SCSI) layer, a memory interface layer (e.g., UFS, UniPro), or a combination thereof. In some examples, the one or more layers of the service layers 320 may re-order the commands 330 (e.g., according to a second sequence) for transmission to the memory system 310. For example, an I/O scheduler may re-order commands to optimize disk access requests, for example to group requests that are within a section, bank, or block of addresses, or may re-order commands to balance priority for different processes.

By way of example, the service layers 320 may re-order the commands 330 such that the fourth command 330-*d* is transmitted first, the second command 330-*b* is transmitted after the fourth command 330-*d*, the first command 330-*a* is transmitted after the second command 330-*b*, and the third command 330-*c* is transmitted after the second command 330-*b*. Additionally or alternatively, the memory command may insert additional commands into the commands 330. For example, the service layers 320 may insert a command 330-*e* into the commands 330 (e.g., between the first command 330-*a* and the third command 330-*c*).

In some cases, re-ordering of commands may cause corruption to a file structure maintained by file system 315. For example, if the memory system 310 or the host system 305 undergo an asynchronous power loss, the memory system 310 may fail to complete execution of at least some of the commands 330 (e.g., if some of the commands 330 are not received, or execution is not completed), and data associated with the incomplete commands may be lost or corrupted, while data associated with the completed commands may be successfully stored. In such examples, the host system 305 or the memory system 310 may attempt to rebuild or determine which of the commands 330 have been completed and which of the commands 33 have been lost. For example, the file system 315 may issue a synchronization command between some of the commands 330. The synchronization command may allow the file system to ensure that commands after the synchronization command are not executed by the memory system 310 prior to execution of the commands prior to the synchronization command. For example, the synchronization command may instruct the service layers 320 of the host system 305 to clear out or empty one or more queued commands prior to passing on any commands received after the synchronization command. Thus, an original order of a first set of commands prior to the synchronization command and a second set of commands after the synchronization command is preserved. For example, the file system 315 may issue a synchronization command after the second command 330-*b*, and thus may ensure that the first command 330-*a* and the second command 330-*b* are executed prior to the third command 330-*c* and the fourth command 330-*d* (e.g., the service layers 320 may re-order the first command 330-*a* and the second command 330-*b* with each other, and may re-order the third command 330-*c* and the fourth command 330-*d* with each other). However, the synchronization command may be computationally expensive or inefficient due to the time or resources used to perform queued commands. Additionally or alternatively, the host system 305 may insert a barrier command into the commands 330. The barrier command may instruct system 310 to perform commands received before the barrier command prior to performing commands received after the barrier command. However, certain layers of the service layers 320 may not implement or comply with the barrier command, and may thus reorder commands across the barrier command or may re-order the barrier command itself. Thus, using the barrier command may not preserve the order of the commands 330 generated by the file system 315 through execution at the memory system 310.

As illustrated in FIG. 3, the host system 305 may insert or include a sequence identifier 345 in each of the commands 330 generated by the file system 315. The sequence identifier 345 may indicate the order in which the file system 315 generated the commands 330. Accordingly, the host system 305 or the memory system 310 may use the sequence identifiers 345 included in the commands 330 to determine or rebuild the order of the commands generated by the file system 315. In some examples, the sequence identifier 345 may by inserted into a field of a command 330, for example by configuring a reserved or other type of field included in the command 330. The field used to store the sequence identifier 345 may depend on the storage protocol used by the host system 305 and the memory system 310. For example, in a SCSI protocol, the field used to store the sequence identifier 345 may include four bytes in command descriptor block (CDB) bytes. Additionally or alternatively, in an non-volatile memory express (NVMe) protocol, the field may be an example of a 4 byte codeword.

In some cases, the file system 315 may include a counter to track and identify the sequence identifier 345. For example, the file system 315 may use a value of the counter to insert a sequence identifier 345 into a command. After inserting the sequence identifier 345, the file system 315 may increment the value of the counter. Accordingly, the incremented value may be used in a sequence identifier 345 for a subsequent command. In some examples, not all commands generated by the file system 315 may increment the counter. In such cases, the commands which increment the counter may be specified in a table or protocol specification.

In some cases, service layers 320 may insert additional identifiers different than the sequence identifier 345 to the commands 330, such as identifiers associated with flow control mechanisms such as transmission control protocol (TCP). However, such additional identifiers may not persist across layers (e.g., may not be included in the commands 330 transmitted to the memory system 310, or may be stripped by an interface of the memory system 310 such as a UniPro or UFS interface), while the sequence identifier 345 may remain in the commands 330 across layers of the host system 305 and may be transmitted to the memory system 310 within data units output by interface 325 of the memory system associated with the commands 330. For example, the sequence identifiers 345 inserted by file system 315 may be first identifiers, and one or more of service layers 320 may insert second identifiers of data units transported to memory device 310, which may be stripped by a corresponding layer of memory device 310. That is, the sequence identifiers 345 inserted by the file system 315 may be independent of identifiers used for layer-specific flow control by the service layers 320.

In some examples, after the commands 330 have gone through the service layers 320, the host system 305 may transmit the commands 330 to the memory system 310. The memory system 310 may receive the commands in the order generated by the service layers 320. In some examples, the memory system 310 may include an interface 325 (which may be a corresponding interface to a memory interface of service layers 320) to receive the commands 330 and schedule them for executing or processing by the memory system 310. For example, after receiving the commands 330, the interface 325 may store the commands in a queue (e.g., a command queue 260 as described with reference to FIG. 2). In some cases, the memory system 310 may execute the command 330 in the order received from the host system 305. Additionally or alternatively, the memory system 310 may again re-order the commands 330 (e.g., according to a third sequence), and may perform additional memory operations (e.g., wear leveling, garbage collection) interspersed with the commands. In such examples, the memory system 310 may perform the commands 330 in the new order (e.g., the third sequence). In some cases, as part of performing the commands 330, the memory system 310 may store a command table or other indication of the sequence identifiers 345 of completed commands, for example in a non-volatile portion of the memory system 310.

In some examples, prior to completing each of the commands 330, the memory system 310, the host system 305, or both may undergo a power cycle or power loss event 335 (e.g., an unexpected power loss or an asynchronous power loss). In such examples, upon powering back on, the host system 305 or the memory system 310 may attempt to rebuild or repair a file structure used by the file system 315, such as by rebuilding a file table of the file system 315 or by rebuilding or repairing an L2P table for the memory system 310. In some cases, the memory system 310 may determine which of the commands 330 were successfully performed using the command table populated as part of performing the commands 330.

By way of example, prior to the power loss event 335, the memory system may perform and store the sequence identifier 345 of the fourth command 330-d, the second command 330-b, and the first command 330-a. Upon powering back on (e.g., if the memory system 310 determines a power on condition), the memory system 310 may determine that the fourth command 330-d, the second command 330-b, and the first command 330-a have been performed, but that the third command 330-c may not have been performed. For example, the memory system 310 may determine that a gap or discontinuity exists between the sequence identifiers 345 of the command table (e.g., a discontinuity between the second command 330-b and the fourth command 330-d). Because the third command 330-c may contain information or data associated with the fourth command 330-d (e.g., file system information, metadata, etc.), the memory system 310 may not be able to determine whether the data associated with the fourth command 330-d is valid. Accordingly, the memory system may invalidate data associated with commands having sequence identifiers 345 after the discontinuity (e.g., sequence identifier 345 larger than a sequence identifier 345 of the latest valid command before the discontinuity). For example, the memory system may invalidate data associated with the fourth command 330-d, for example by invalidating the logical addresses for data associated with the fourth command 330-d. In some examples, the sequence identifier 345 associated with a command may be stored along with the corresponding data or logical address for the data. For example, a sequence identifier 345 may be included in the L2P table to indicate the sequence identifier 345 associated with the data. Thus, the memory system 310 may determine that the latest valid command may be the second command 330-b.

In some cases, the memory system 310 may store an indication of the latest valid command, for example in a buffer or register. Accordingly, after the power loss event 335, the host system 305 may determine the latest valid command by issuing a read command for the register.

Additionally or alternatively, the file system 315 may use other commands according to a technique to determine the latest valid command. For example, the file system 315 may periodically issue a write command or write command with forced unit access (FUA) to store the sequence identifier 345 of the last issued command (e.g., a most recent command generated by the file system 315) in a non-volatile location of the memory system 310. In some cases, the host system 305 may also issue a synchronization command (e.g., either before or after the write command) to ensure the ordering of the commands 330 of the file system 315. In such cases, the file system 315 may control or determine the latest valid command. Accordingly, if the host system 305 detects a power loss event of the memory system 310, the file system 315 may transmit a notification of the latest valid command to the memory system 310, for example by storing an indication of the latest valid command to a register or descriptor of the memory system 310. In some cases, the memory system 310 may discard or invalidate data associated with commands having sequence identifiers 345 after the sequence identifier of the latest valid command.

Figure 4:
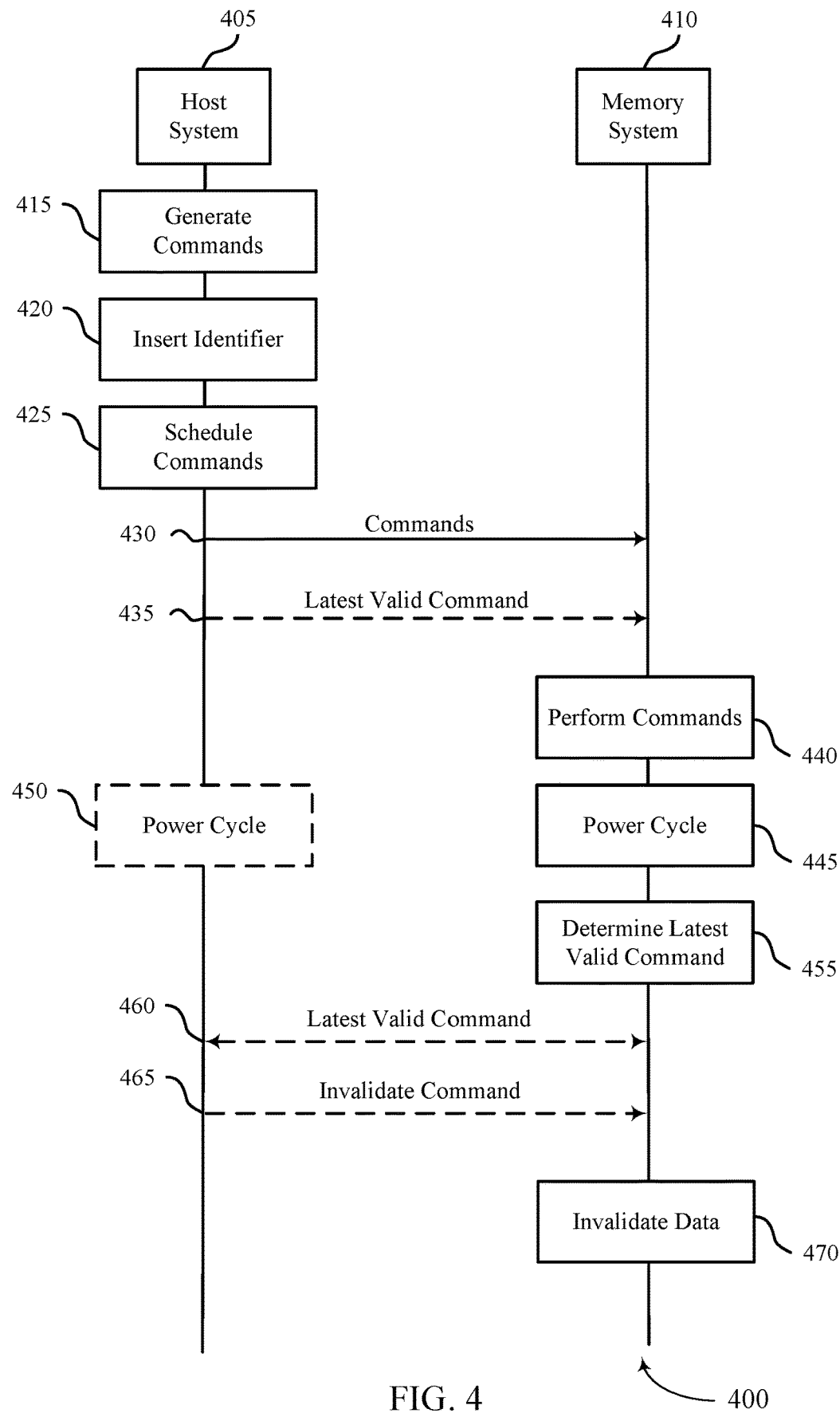
FIG. 4 illustrates an example of a process flow that supports techniques for controlling command order in accordance with examples as disclosed herein.

FIG. 4 illustrates an example of a process flow 400 that supports techniques for controlling command order in accordance with examples as disclosed herein. In some examples, process flow 400 may be implemented by aspects of the system 300. The process flow 400 may include operations performed by a host system 405 and a memory system 410 which may be an example of the host system 305 and the memory system 310 described with reference to FIG. 3. For example, the host system 405 may include a file system, such as the file system 315, and one or more service layers. In some cases, the service layers (e.g., service layers 320) may include a memory interface. Additionally, the memory system 410 may include an interface (e.g., interface 325), which may be a corresponding interface to the memory interface of the host system 405. In the following description of the process flow 400, the operations may be performed in a different order than the order shown. For example, specific operations may also be left out of the process flow 400, or other operations may be added to process flow 400.

In some examples, the process flow 400 may include generating one or more commands. For example, at 415, the file system of the host system 405 may generate a set of commands for the memory system 410 using a first sequence (e.g., an initial order of the set of commands). In some cases, the set of commands may include commands to store or read data at the memory system 410 or to update a mapping of data or update information for the file system of the memory system 410).

In some examples, the process flow 400 may include inserting an identifier into each command of the set of commands generated by the file system at 415. For example, at 420, the file system of the host system 405 may insert a sequence identifier (e.g., the sequence identifier 345 as described with reference to FIG. 3) into each of the commands of the set of commands. In some case, the sequence identifier may be included in a field of the command (e.g., a reserved field). The sequence identifier may indicate the relative order of each command of the set of commands generated at 315. For example, a first command of the set may include a sequence identifier corresponding to one, a second command of the set may include a sequence identifier corresponding to two, and so on.

In some cases, the file system of the host system 405 may include a counter to track the current sequence identifier. For example, the sequence identifier inserted into a command by file system of the host system 405 may correspond to a value of the counter. After inserting the sequence identifier, the file system of the host system 405 may determine whether to increment the value of the counter (e.g., such that the next sequence identifier inserted into the next command of the set corresponds to the incremented value). In some case, the file system of the host system 405 may increment the value of the counter if a type of the command is included in a list or table of commands from a file system (e.g., according to a protocol of the host system 405 and the memory system 410).

In some cases, the process flow 400 may include scheduling the commands for transmission. For example, at 425, the host system 405 may schedule the set of commands generated at 415 for transmission to the memory system 410. In some cases, the scheduling may be performed by a service layer of the host system 405. The service layer may include one or more layers or entities, such as an input/output (I/O) scheduler, a universal flash storage host controller driver (UFSHCD) layer, a small computer system interface (SCSI) layer, or a combination thereof.

In some examples, as part of scheduling the commands, the service layer may adjust the set of commands, such as by reordering the commands to a second sequence that may be different than the first sequence. Further, the service layer may add or split commands of the set of commands. For example, the service layer may insert one or more additional commands (e.g., commands related to flow control or configuration of the service layer). In such examples, a sequence identifier may not be included in the additional commands. For example, the one or more additional commands may be exclusive of the sequence identifiers of the commands generated at 415. Additionally or alternatively, the service layer may segment a command into multiple commands. For example, the service layer may segment a write command for a relatively large amount of data into one or more write commands, each write command associated with a portion of the data. In such cases, the segmented commands may include the same sequence identifier as the original command.

In some examples, the host system 405 may keep track of a latest valid command of the set of commands. For example, the host system 405 may insert a synchronization command (e.g., a synchronization command as described with reference to FIG. 3) into the set of commands. Subsequently, at 435, the host system 405 may generate and transmit a write command to store the sequence identifier of a latest command of the set of commands generated at 415 at a non-volatile location of the memory system 410.

In some example, once the commands have been scheduled for transmission, the process flow 400 may include communicating the commands. For example, at 430, the host system 405 may transmit the commands to the memory system 410. In some cases, the commands may be communicated using the second sequence. Accordingly, the memory system 410 may receive and store the commands for executing (e.g., in a command queue of the memory system 410) according to the second sequence.

In some examples, the process flow 400 may include performing at least a portion of the commands. For example, at 440, the memory system 410 may begin performing the commands received at 430. In some example, prior to performing the commands, the memory system 410 may schedule the commands. For example, the memory system 410 may reorder the commands according to a third sequence. In some examples, the third sequence may be different than the first sequence and the second sequence. Additionally or alternatively, the third sequence may be the same as the first sequence. Further, the memory system 410 may insert additional commands into the set of received commands, may segment commands of the set of received commands, or both. In some cases, as part of performing the commands, the memory system 410 may store a log or table of completed commands. For example, after completing a command, the memory system 410 may store an indication of the command, including an indication of the sequence identifier of the command, in a non-volatile location of the memory system 410.

In some examples, while performing the commands at 440, the memory system 410, the host system 405, or both may experience a power cycle or power loss event (e.g., there may be an unexpected power loss or an asynchronous power loss between the host system 405 and the memory system 410). Thus, some of the commands received at 430 may be lost (e.g., if the commands were stored in a volatile queue or buffer of the memory system 410). Accordingly, the memory system may, at 445, power on and perform an operation to repair data or other information associated with the set of commands.

For example, at 450, the memory system 410 may determine the latest valid command performed prior to the power cycle event at 445. In some cases, the memory system 410 may determine that a gap or discontinuity exists between the sequence identifiers of commands performed prior to the power cycle event at 445, for example using a stored indication of completed commands. For example, the memory system 410 may determine a discontinuity between the sequence identifiers of a first continuous subset of the commands and a second subset of the commands. In some cases, the discontinuity may correspond to a command that was lost during the power cycle event.

In some examples, the memory system 410 may store an indication of the latest valid command in a register or buffer In some cases, the register may be accessible to the host system 405 (e.g., using a read command for the register). Accordingly, at 460, the host system 405 may transmit a request (e.g., a read command for the register) to retrieve the indication of the latest valid command, and the memory system 410 may, in response to receiving the request, transmit the indication of the latest valid command.

Because the lost command may contain information or data associated with the commands in the second subset (e.g., commands after the discontinuity), the memory system 410 may not be able to determine whether the data associated with the commands in the second subset is valid. Accordingly, at 470, the memory system 410 may invalidate data associated with commands of the second subset of commands, for example by invalidating the logical addresses for the data. In some cases, invalidating the data may include rebuilding a mapping between one or more logical addresses associated with commands of the first subset and one or more physical addresses associated with commands of the first subset, such as an L2P table. Additionally or alternatively, invalidating the data may include refraining from rebuilding a mapping between one or more logical addresses associated with commands of the second subset and one or more physical addresses associated with commands of the second subset.

Additionally or alternatively, the host system 405 may determine the latest valid command. For example, if the host system 405 stored the latest valid command at 435, after the host system 405 detects a power cycle event at 455, host system 405 may transmit a read request to retrieve the latest valid command. Accordingly, the host system may, at 465, transmit an invalidate command. In some cases, the invalidate command may instruct the memory system 410 to invalidate data associated with commands having sequence identifiers subsequent to the sequence identifier of the latest valid command. The host system 405 may subsequently build a file structure using the valid data stored in the memory system 410 (e.g., using one or more read or write commands). Invalidating data associated with commands after the latest valid command may protect the integrity of the file structure rebuilt after the power loss event.

Aspects of the process flow 400 may be implemented by a controller, among other components. Additionally or alternatively, aspects of the process flow 400 may be implemented as instructions stored in memory (e.g., firmware stored in a memory coupled with the host system 405 or the memory system 410). For example, the instructions, when executed by a controller, may cause the controller to perform the operations of the process flow 400.

Figure 5:
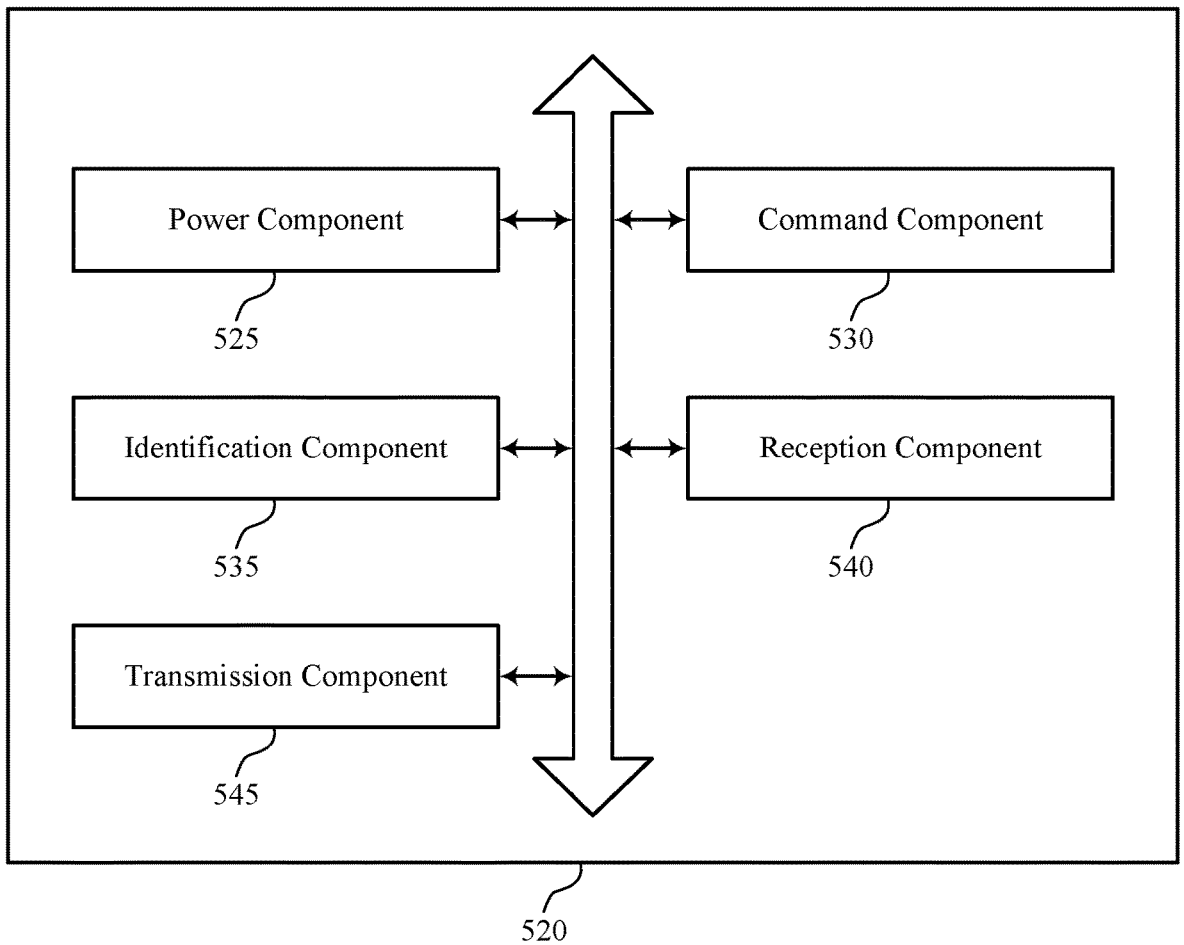
FIG. 5 shows a block diagram of a memory system that supports techniques for controlling command order in accordance with examples as disclosed herein.

FIG. 5 shows a block diagram 500 of a memory system 520 that supports techniques for controlling command order in accordance with examples as disclosed herein. The memory system 520 may be an example of aspects of a memory system as described with reference to FIGS. 1 through 4. The memory system 520, or various components thereof, may be an example of means for performing various aspects of techniques for controlling command order as described herein. For example, the memory system 520 may include a power component 525, a command component 530, an identification component 535, a reception component 540, a transmission component 545, or any combination thereof. Each of these components may communicate, directly or indirectly, with one another (e.g., via one or more buses).

The power component 525 may be configured as or otherwise support a means for determining a power on condition of a memory system. The command component 530 may be configured as or otherwise support a means for determining, based at least in part on the power on condition, a plurality of commands performed prior to the power on, each command of the plurality of commands associated with a respective identifier. The identification component 535 may be configured as or otherwise support a means for determining a discontinuity between the respective identifiers of a first subset of the plurality of commands and a second subset of the plurality of commands, where the identifiers of the first subset are continuous. In some examples, the command component 530 may be configured as or otherwise support a means for invalidating one or more logical addresses associated with commands of the second subset based at least in part on determining the discontinuity.

In some examples, the reception component 540 may be configured as or otherwise support a means for receiving the plurality of commands from a host system based at least in part on a first sequence, where each command of the plurality of commands includes the respective identifier. In some examples, the command component 530 may be configured as or otherwise support a means for performing the plurality of commands, where determining the power on condition occurs subsequent to performing the plurality of commands.

In some examples, the identification component 535 may be configured as or otherwise support a means for storing, based at least in part on performing the plurality of commands, an indication of the plurality of commands in a non-volatile storage of the memory system.

In some examples, the command component 530 may be configured as or otherwise support a means for schedule, basing at least in part on receiving the plurality of commands, the plurality of commands for execution by the memory system, where the scheduling includes re-ordering the plurality of commands according to a second sequence that is different than the first sequence, including additional commands in the plurality of commands, or both, and where performing the plurality of commands is based at least in part on the scheduling.

In some examples, the identification component 535 may be configured as or otherwise support a means for storing, based at least in part on the discontinuity, the respective identifier of a command of the first subset in a register, where the respective identifier of the command indicates a latest command of the first subset.

In some examples, the reception component 540 may be configured as or otherwise support a means for receiving a command from a host system for an indication of the respective identifier of the command based at least in part in on storing the respective identifier. In some examples, the transmission component 545 may be configured as or otherwise support a means for transmitting the indication of the identifier to the host system.

In some examples, each command of the plurality of commands includes a respective field, the respective field including an indication of the respective identifier.

In some examples, the command component 530 may be configured as or otherwise support a means for rebuilding, based at least in part on determining the discontinuity, a mapping between one or more logical addresses associated with commands of the first subset and one or more physical addresses associated with commands of the first sub set.

In some examples, the power component 525 may be configured as or otherwise support a means for determining a power on condition of a memory system. In some examples, the command component 530 may be configured as or otherwise support a means for determining, based at least in part on the power on condition, a plurality of commands performed prior to the power on, each command of the plurality of commands associated with a respective identifier. In some examples, the identification component 535 may be configured as or otherwise support a means for determining a discontinuity between the respective identifiers of a first subset of the plurality of commands and a second subset of the plurality of commands, where the identifiers of the first subset are continuous. In some examples, the command component 530 may be configured as or otherwise support a means for invalidating one or more logical addresses associated with commands of the second subset based at least in part on determining the discontinuity.

In some examples, the reception component 540 may be configured as or otherwise support a means for receiving the plurality of commands from a host system based at least in part on a first sequence, where each command of the plurality of commands includes the respective identifier. In some examples, the command component 530 may be configured as or otherwise support a means for performing one or more of the plurality of commands, where the one or more of the plurality of commands includes the first subset of the plurality of commands.

In some examples, the identification component 535 may be configured as or otherwise support a means for storing, based at least in part on performing the one or more of the plurality of commands, an indication of the one or more of the plurality of commands in a non-volatile storage of the memory system.

In some examples, the command component 530 may be configured as or otherwise support a means for scheduling, based at least in part on receiving the plurality of commands, the plurality of commands for execution by the memory system, where the scheduling including re-ordering the plurality of commands according to a second sequence that is different than the first sequence, including additional commands in the plurality of commands, or both, and where performing one or more of the plurality of commands is based at least in part on the scheduling.

In some examples, the identification component 535 may be configured as or otherwise support a means for storing, based at least in part on the discontinuity, the respective identifier of a command of the first subset in a register, where the respective identifier of the command indicates a latest valid command.

In some examples, the reception component 540 may be configured as or otherwise support a means for receiving a command from a host system for an indication of an identifier for a command of the plurality of commands based at least in part in on transmitting the plurality of commands. In some examples, the transmission component 545 may be configured as or otherwise support a means for transmitting the indication of the identifier from the memory system.

In some examples, each command of the plurality of commands includes a respective field, the respective field including an indication of the respective identifier.

In some examples, the command component 530 may be configured as or otherwise support a means for rebuilding, based at least in part on determining the discontinuity, a mapping between one or more logical addresses associated with commands of the first subset and one or more physical addresses associated with commands of the first sub set.

In some examples, invalidating the one or more logical addresses includes refraining from rebuilding a mapping between the one or more logical addresses associated with commands of the second subset and one or more physical addresses associated with commands of the second subset.

Figure 6:
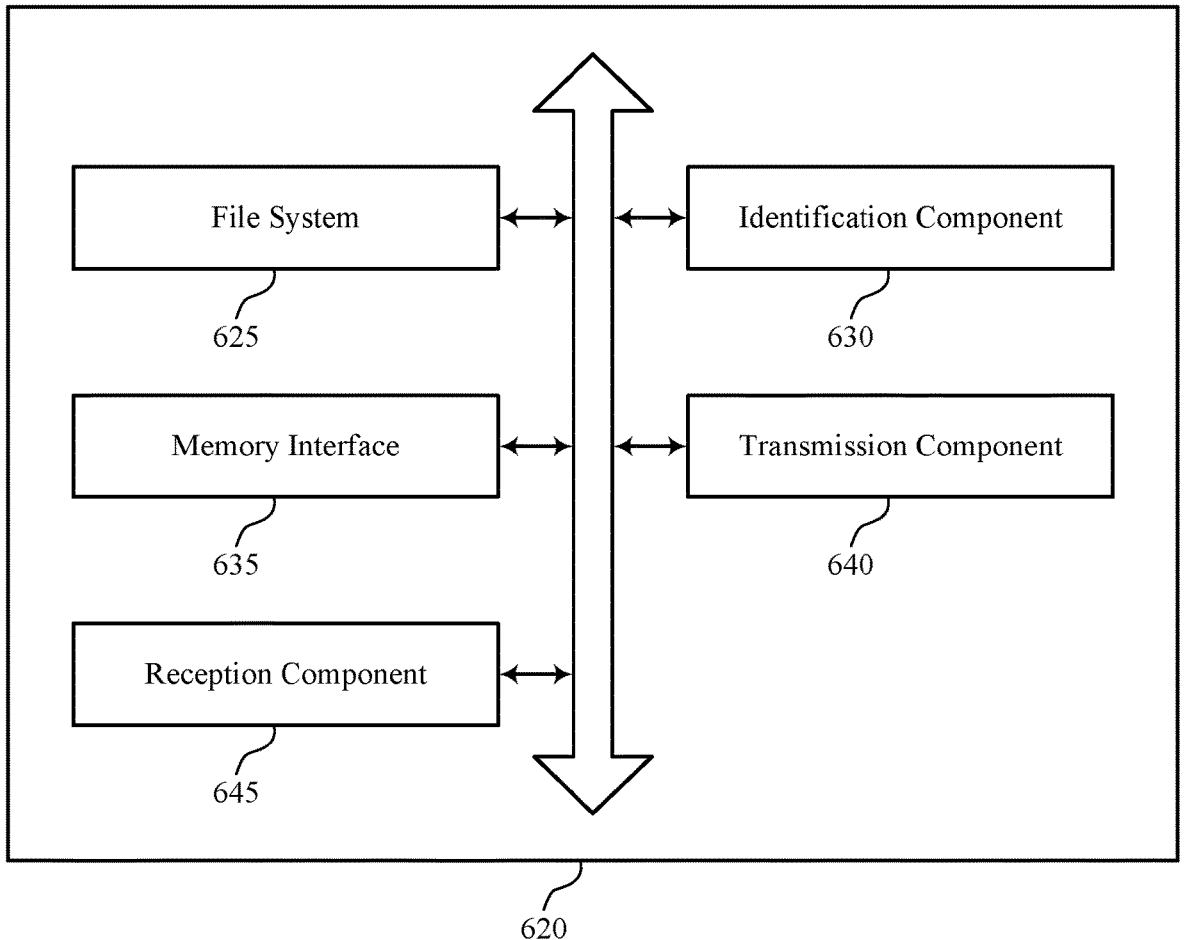
FIG. 6 shows a block diagram of a host system that supports techniques for controlling command order in accordance with examples as disclosed herein.

FIG. 6 shows a block diagram 600 of a host system 620 that supports techniques for controlling command order in accordance with examples as disclosed herein. The host system 620 may be an example of aspects of a host system as described with reference to FIGS. 1 through 4. The host system 620, or various components thereof, may be an example of means for performing various aspects of techniques for controlling command order as described herein. For example, the host system 620 may include a file system 625, an identification component 630, a memory interface 635, a transmission component 640, a reception component 645, or any combination thereof. Each of these components may communicate, directly or indirectly, with one another (e.g., via one or more buses).

The file system 625 may be configured as or otherwise support a means for generating, by a file system of a host system, a plurality of commands for a memory system, the plurality of commands having a first sequence. The identification component 630 may be configured as or otherwise support a means for inserting a respective identifier into each command of the plurality of commands, the respective identifiers based at least in part on the first sequence. The memory interface 635 may be configured as or otherwise support a means for scheduling, via a memory interface of the host system, the plurality of commands for transmission to the memory system, where the scheduling includes re-ordering the plurality of commands according to a second sequence that is different than the first sequence. The transmission component 640 may be configured as or otherwise support a means for transmitting the plurality of commands to the memory system based at least in part on the second sequence.

In some examples, the transmission component 640 may be configured as or otherwise support a means for transmitting a command to the memory system for an indication of an identifier for a command of the plurality of commands based at least in part in on transmitting the plurality of commands. In some examples, the reception component 645 may be configured as or otherwise support a means for receiving the indication of the identifier from the memory system. In some examples, the identification component 630 may be configured as or otherwise support a means for identifying a subset of the plurality of commands based at least in part on the indication, where each command of the subset has been performed by the memory system.

In some examples, to support inserting the respective identifier to each command of the plurality of commands, the identification component 630 may be configured as or otherwise support a means for generating the respective identifier for each command of the plurality of commands based at least in part on the first sequence. In some examples, to support inserting the respective identifier to each command of the plurality of commands, the identification component 630 may be configured as or otherwise support a means for configuring a respective field of each command of the plurality of commands to include an indication of the respective identifier.

In some examples, the identification component 630 may be configured as or otherwise support a means for incrementing a value of a counter based at least in part on generating a command of the plurality of commands, where the respective identifier of each command of the plurality of commands is based at least in part on the value of the counter.

In some examples, the identification component 630 may be configured as or otherwise support a means for determining whether to increment the value of the counter based at least in part on a type of the commands, where incrementing the value of the counter is based at least in part on the determining.

In some examples, scheduling the plurality of commands further includes including additional commands in the plurality of commands.

In some examples, the memory interface of the host system includes an in/out (I/O) scheduler, a universal flash storage host controller driver (UFSHCD), a small computer system interface (SCSI) layer, or a combination thereof.

Figure 7:
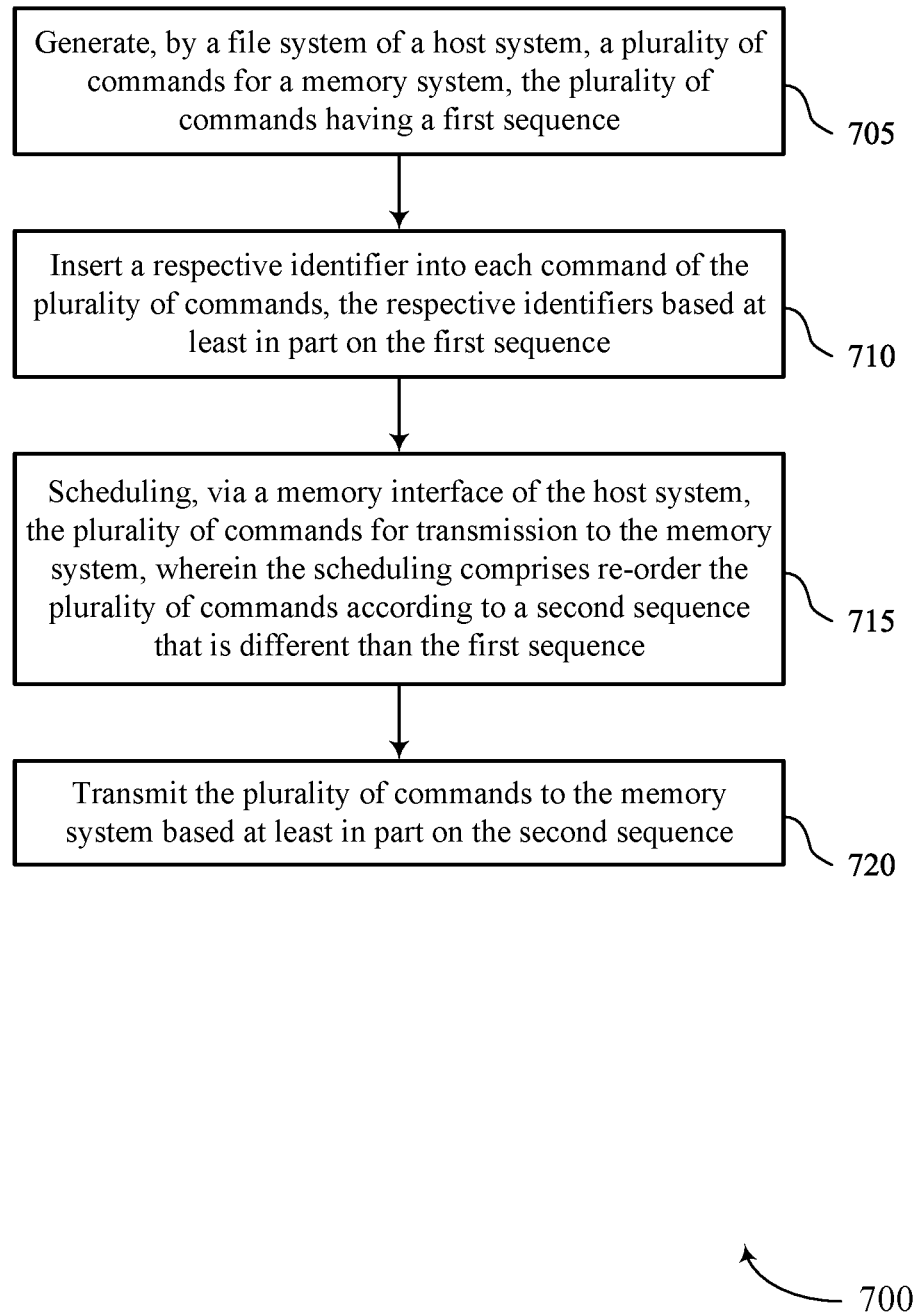
FIGS. 7 and 8 show flowcharts illustrating a method or methods that support techniques for controlling command order in accordance with examples as disclosed herein.

FIG. 7 shows a flowchart illustrating a method 700 that supports techniques for controlling command order in accordance with examples as disclosed herein. The operations of method 700 may be implemented by a host system or its components as described herein. For example, the operations of method 700 may be performed by a host system as described with reference to FIGS. 1 through 4 and 6. In some examples, a host system may execute a set of instructions to control the functional elements of the device to perform the described functions. Additionally or alternatively, the host system may perform aspects of the described functions using special-purpose hardware.

At 705, the method may include generating, by a file system of a host system, a plurality of commands for a memory system, the plurality of commands having a first sequence. The operations of 705 may be performed in accordance with examples as disclosed herein. In some examples, aspects of the operations of 705 may be performed by a file system 625 as described with reference to FIG. 6.

At 710, the method may include inserting a respective identifier into each command of the plurality of commands, the respective identifiers based at least in part on the first sequence. The operations of 710 may be performed in accordance with examples as disclosed herein. In some examples, aspects of the operations of 710 may be performed by an identification component 630 as described with reference to FIG. 6.

At 715, the method may include scheduling, via a memory interface of the host system, the plurality of commands for transmission to the memory system, where the scheduling includes re-ordering the plurality of commands according to a second sequence that is different than the first sequence. The operations of 715 may be performed in accordance with examples as disclosed herein. In some examples, aspects of the operations of 715 may be performed by a memory interface 635 as described with reference to FIG. 6.

At 720, the method may include transmitting the plurality of commands to the memory system based at least in part on the second sequence. The operations of 720 may be performed in accordance with examples as disclosed herein. In some examples, aspects of the operations of 720 may be performed by a transmission component 640 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for generating, by a file system of a host system, a plurality of commands for a memory system, the plurality of commands having a first sequence; inserting a respective identifier into each command of the plurality of commands, the respective identifiers based at least in part on the first sequence; scheduling, via a memory interface of the host system, the plurality of commands for transmission to the memory system, where the scheduling includes re-ordering the plurality of commands according to a second sequence that is different than the first sequence; and transmitting the plurality of commands to the memory system based at least in part on the second sequence.

Aspect 2: The method, apparatus, or non-transitory computer-readable medium of aspect 1, further including operations, features, circuitry, logic, means, or instructions, or any combination thereof for transmitting a command to the memory system for an indication of an identifier for a command of the plurality of commands based at least in part in on transmitting the plurality of commands; receiving the indication of the identifier from the memory system; and identifying a subset of the plurality of commands based at least in part on the indication, where each command of the subset has been performed by the memory system.

Aspect 3: The method, apparatus, or non-transitory computer-readable medium of any of aspects 1 through 2 where inserting the respective identifier to each command of the plurality of commands includes operations, features, circuitry, logic, means, or instructions, or any combination thereof for generating the respective identifier for each command of the plurality of commands based at least in part on the first sequence and configuring a respective field of each command of the plurality of commands to include an indication of the respective identifier.

Aspect 4: The method, apparatus, or non-transitory computer-readable medium of any of aspects 1 through 3, further including operations, features, circuitry, logic, means, or instructions, or any combination thereof for incrementing a value of a counter based at least in part on generating a command of the plurality of commands, where the respective identifier of each command of the plurality of commands is based at least in part on the value of the counter.

Aspect 5: The method, apparatus, or non-transitory computer-readable medium of aspect 4, further including operations, features, circuitry, logic, means, or instructions, or any combination thereof for determining whether to increment the value of the counter based at least in part on a type of the commands, where incrementing the value of the counter is based at least in part on the determining.

Aspect 6: The method, apparatus, or non-transitory computer-readable medium of any of aspects 1 through 5 where scheduling the plurality of commands further includes including additional commands in the plurality of commands.

Aspect 7: The method, apparatus, or non-transitory computer-readable medium of any of aspects 1 through 6 where the memory interface of the host system includes an in/out (I/O) scheduler, a universal flash storage host controller driver (UFSHCD), a small computer system interface (SCSI) layer, or a combination thereof.

Figure 8:
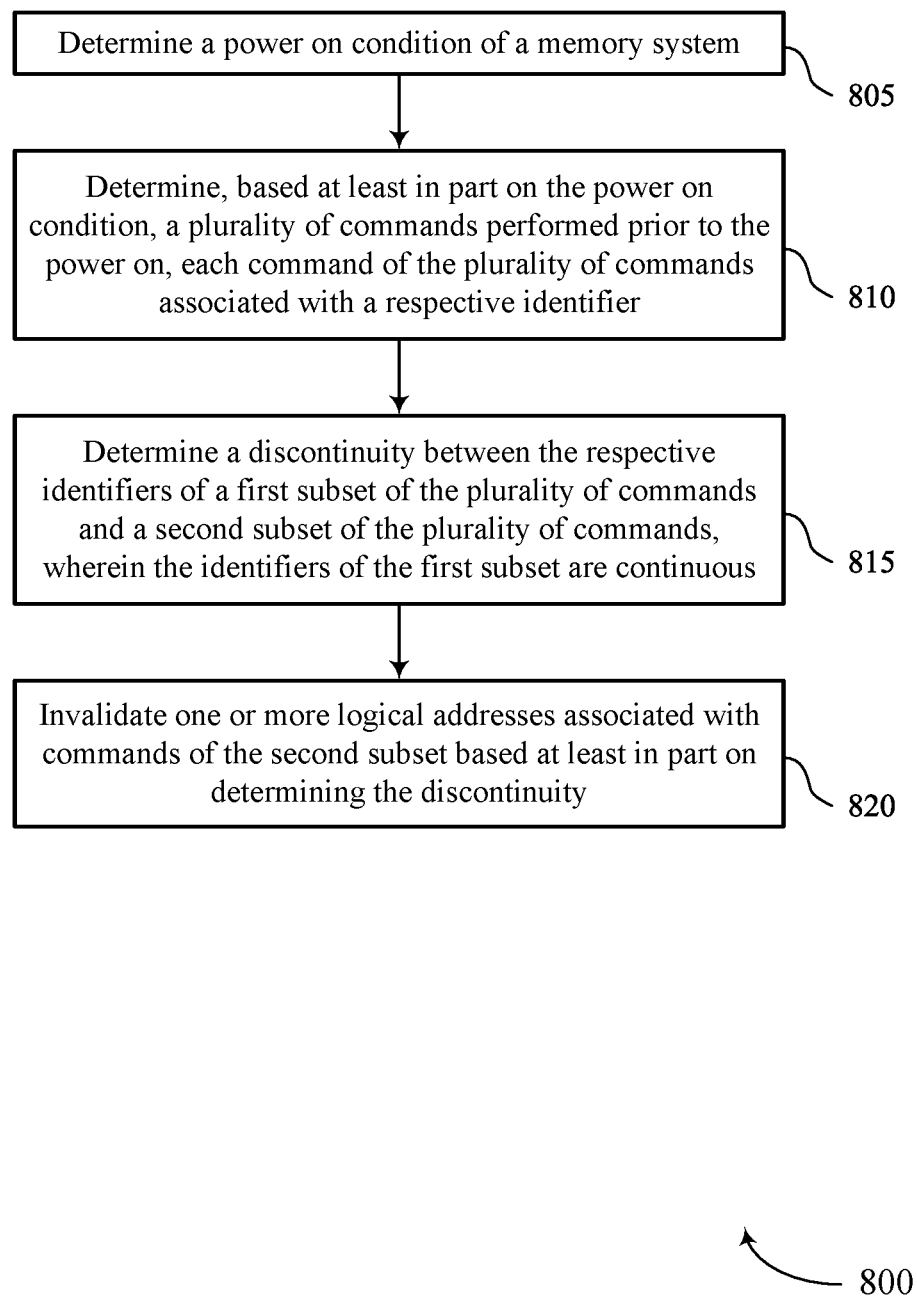

FIG. 8 shows a flowchart illustrating a method 800 that supports techniques for controlling command order in accordance with examples as disclosed herein. The operations of method 800 may be implemented by a memory system or its components as described herein. For example, the operations of method 800 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 805, the method may include determining a power on condition of a memory system. The operations of 805 may be performed in accordance with examples as disclosed herein. In some examples, aspects of the operations of 805 may be performed by a power component 525 as described with reference to FIG. 5.

At 810, the method may include determining, based at least in part on the power on condition, a plurality of commands performed prior to the power on, each command of the plurality of commands associated with a respective identifier. The operations of 810 may be performed in accordance with examples as disclosed herein. In some examples, aspects of the operations of 810 may be performed by a command component 530 as described with reference to FIG. 5.

At 815, the method may include determining a discontinuity between the respective identifiers of a first subset of the plurality of commands and a second subset of the plurality of commands, where the identifiers of the first subset are continuous. The operations of 815 may be performed in accordance with examples as disclosed herein. In some examples, aspects of the operations of 815 may be performed by an identification component 535 as described with reference to FIG. 5.

At 820, the method may include invalidating one or more logical addresses associated with commands of the second subset based at least in part on determining the discontinuity. The operations of 820 may be performed in accordance with examples as disclosed herein. In some examples, aspects of the operations of 820 may be performed by a command component 530 as described with reference to FIG. 5.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 8: A method, apparatus, or non-transitory computer-readable medium including operations, features, circuitry, logic, means, or instructions, or any combination thereof for determining a power on condition of a memory system; determining, based at least in part on the power on condition, a plurality of commands performed prior to the power on, each command of the plurality of commands associated with a respective identifier; determining a discontinuity between the respective identifiers of a first subset of the plurality of commands and a second subset of the plurality of commands, where the identifiers of the first subset are continuous; and invalidating one or more logical addresses associated with commands of the second subset based at least in part on determining the discontinuity.

Aspect 9: The method, apparatus, or non-transitory computer-readable medium of aspect 8, further including operations, features, circuitry, logic, means, or instructions, or any combination thereof for receiving the plurality of commands from a host system based at least in part on a first sequence, where each command of the plurality of commands includes the respective identifier and performing one or more of the plurality of commands, where the one or more of the plurality of commands includes the first subset of the plurality of commands.

Aspect 10: The method, apparatus, or non-transitory computer-readable medium of aspect 9, further including operations, features, circuitry, logic, means, or instructions, or any combination thereof for storing, based at least in part on performing the one or more of the plurality of commands, an indication of the one or more of the plurality of commands in a non-volatile storage of the memory system.

Aspect 11: The method, apparatus, or non-transitory computer-readable medium of any of aspects 9 through 10, further including operations, features, circuitry, logic, means, or instructions, or any combination thereof for scheduling, based at least in part on receiving the plurality of commands, the plurality of commands for execution by the memory system, where the scheduling including re-ordering the plurality of commands according to a second sequence that is different than the first sequence, including additional commands in the plurality of commands, or both, and where performing one or more of the plurality of commands is based at least in part on the scheduling.

Aspect 12: The method, apparatus, or non-transitory computer-readable medium of any of aspects 8 through 11, further including operations, features, circuitry, logic, means, or instructions, or any combination thereof for storing, based at least in part on the discontinuity, the respective identifier of a command of the first subset in a register, where the respective identifier of the command indicates a latest valid command.

Aspect 13: The method, apparatus, or non-transitory computer-readable medium of any of aspects 8 through 12, further including operations, features, circuitry, logic, means, or instructions, or any combination thereof for receiving a command from a host system for an indication of an identifier for a command of the plurality of commands based at least in part in on transmitting the plurality of commands and transmitting the indication of the identifier from the memory system.

Aspect 14: The method, apparatus, or non-transitory computer-readable medium of any of aspects 8 through 13 where each command of the plurality of commands includes a respective field, the respective field including an indication of the respective identifier.

Aspect 15: The method, apparatus, or non-transitory computer-readable medium of any of aspects 8 through 14, further including operations, features, circuitry, logic, means, or instructions, or any combination thereof for rebuilding, based at least in part on determining the discontinuity, a mapping between one or more logical addresses associated with commands of the first subset and one or more physical addresses associated with commands of the first subset.

Aspect 16: The method, apparatus, or non-transitory computer-readable medium of any of aspects 8 through 15 where invalidating the one or more logical addresses includes refraining from rebuilding a mapping between the one or more logical addresses associated with commands of the second subset and one or more physical addresses associated with commands of the second subset.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 17: An apparatus, including: a file system of a host system, the file system configured to: generate a plurality of commands for a memory system, the plurality of commands having a first sequence; insert a respective identifier into each command of the plurality of commands, the respective identifiers based at least in part on the first sequence; a memory interface of the host system, the memory interface configured to: schedule the plurality of commands for transmission to the memory system according to a second sequence that is different than the first sequence; and transmit the plurality of commands to the memory system based at least in part on the second sequence.

Aspect 18: The apparatus of aspect 17, where: the memory interface is further configured to: transmit a command to the memory system for an indication of an identifier for a command of the plurality of commands based at least in part in on transmitting the plurality of commands; and receive the indication of the identifier from the memory system; and the file system is further configured to: identify a subset of the plurality of commands based at least in part on the indication, where each command of the subset has been performed by the memory system.

Aspect 19: The apparatus of any of aspects 17 through 18, where the file system is further configured to: generate the respective identifier for each command of the plurality of commands based at least in part on the first sequence; and configure a respective field of each command of the plurality of commands to include an indication of the respective identifier.

Aspect 20: The apparatus of any of aspects 17 through 19, where the file system is further configured to: increment a value of a counter based at least in part on generating a command of the plurality of commands, where the respective identifier of each command of the plurality of commands is based at least in part on the value of the counter.

Aspect 21: The apparatus of aspect 20, where the file system is further configured to: determine whether to increment the value of the counter based at least in part on a type of the command, where incrementing the value of the counter is based at least in part on the determining.

Aspect 22: The apparatus of any of aspects 17 through 21, where, to schedule the plurality of commands, the memory interface is further configured to: segment a first command of the plurality of commands into multiple sub-commands, where each of the multiple sub-commands includes the respective identifier associated with the first command.

Aspect 23: The apparatus of any of aspects 17 through 22, where the memory interface is further configured to: insert one or more additional commands into the plurality of commands, where each of the one or more additional commands is exclusive of the respective identifiers.

Aspect 24: The apparatus of any of aspects 17 through 23, where the memory interface of the host system includes an I/O scheduler, a universal flash storage host controller driver (UFSHCD), a small computer system interface (SCSI) layer, or a combination thereof.

An apparatus is described. The following provides an overview of aspects of the apparatus as described herein:

Aspect 25: An apparatus, including: a controller associated with a memory system, where the controller is configured to cause the apparatus to: determine a power on condition of the memory system; determine, based at least in part on the power on condition, a plurality of commands performed prior to the power on, each command of the plurality of commands associated with a respective identifier; determine a discontinuity between the respective identifiers of a first subset of the plurality of commands and a second subset of the plurality of commands, where the identifiers of the first subset are continuous; and invalidate one or more logical addresses associated with commands of the second subset based at least in part on determining the discontinuity.

Aspect 26: The apparatus of aspect 25, where the controller is further configured to cause the apparatus to receive the plurality of commands from a host system based at least in part on a first sequence, where each command of the plurality of commands includes the respective identifier, and perform the plurality of commands, where determining the power on condition occurs subsequent to performing the plurality of commands.

Aspect 27: The apparatus of aspect 26, where the controller is further configured to cause the apparatus to store, based at least in part on performing the plurality of commands, an indication of the plurality of commands in a non-volatile storage of the memory system.

Aspect 28: The apparatus of any of aspects 26 through 27, where the controller is further configured to cause the apparatus to: schedule, based at least in part on receiving the plurality of commands, the plurality of commands for execution by the memory system, where the scheduling includes re-ordering the plurality of commands according to a second sequence that is different than the first sequence, including additional commands in the plurality of commands, or both, and where performing the plurality of commands is based at least in part on the scheduling.

Aspect 29: The apparatus of any of aspects 25 through 28, where the controller is further configured to cause the apparatus to: store, based at least in part on the discontinuity, the respective identifier of a command of the first subset in a register, where the respective identifier of the command indicates a latest command of the first subset.

Aspect 30: The apparatus of aspect 29, where the controller is further configured to cause the apparatus to receive a command from a host system for an indication of the respective identifier of the command of the plurality of commands based at least in part in on storing the respective identifier, and transmit the indication of the respective identifier to the host system.

Aspect 31: The apparatus of any of aspects 25 through 30, where each command of the plurality of commands includes a respective field, the respective field including an indication of the respective identifier.

Aspect 32: The apparatus of any of aspects 25 through 31, where the controller is further configured to cause the apparatus to: rebuild, based at least in part on determining the discontinuity, a mapping between one or more logical addresses associated with commands of the first subset and one or more physical addresses associated with commands of the first subset.

Aspect 33: The apparatus of any of aspects 25 through 32, where invalidating the one or more logical addresses includes refraining from rebuilding a mapping between the one or more logical addresses associated with commands of the second subset and one or more physical addresses associated with commands of the second subset.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more controllers associated with the memory system, wherein the one or more controllers are configured to cause the memory system to:
   receive a plurality of commands each comprising a respective identifier corresponding to an order in which each command of the plurality of commands was generated;
   determine a power on condition of the memory system;
   determine, based at least in part on the power on condition, the plurality of commands performed prior to the power on, each command of the plurality of commands associated with one or more logical addresses and the respective identifier;
   determine a discontinuity between the respective identifiers of a first subset of the plurality of commands and a second subset of the plurality of commands, wherein the identifiers of the first subset are continuous; and
   invalidate the one or more logical addresses associated with commands of the second subset based at least in part on determining the discontinuity.

2. The memory system of claim 1, wherein the one or more controllers are further configured to cause the memory system to:
   receive the plurality of commands from a host system based at least in part on a first sequence, wherein each command of the plurality of commands includes the respective identifier; and
   perform the plurality of commands, wherein determining the power on condition occurs subsequent to performing the plurality of commands.

3. The memory system of claim 2, wherein the one or more controllers are further configured to cause the memory system to:
   store, based at least in part on performing the plurality of commands, an indication of the plurality of commands in a non-volatile storage of the memory system.

4. The memory system of claim 2, wherein the one or more controllers are further configured to cause the memory system to:
   schedule, based at least in part on receiving the plurality of commands, the plurality of commands for execution by the memory system, wherein the scheduling comprises re-ordering the plurality of commands according to a second sequence that is different than the first sequence, including additional commands in the plurality of commands, or both, and wherein performing the plurality of commands is based at least in part on the scheduling.

5. The memory system of claim 1, wherein the one or more controllers are further configured to cause the memory system to:
  store, based at least in part on the discontinuity, the respective identifier of a command of the first subset in a register, wherein the respective identifier of the command indicates a latest command of the first subset.

6. The memory system of claim 5, wherein the one or more controllers are further configured to cause the memory system to:
  receive a command from a host system for an indication of the respective identifier of the command of the plurality of commands based at least in part on storing the respective identifier; and
  transmit the indication of the respective identifier to the host system.

7. The memory system of claim 1, wherein each command of the plurality of commands comprises a respective field, the respective field comprising an indication of the respective identifier.

8. The memory system of claim 1, wherein the one or more controllers are further configured to cause the memory system to:
  rebuild, based at least in part on determining the discontinuity, a mapping between one or more logical addresses associated with commands of the first subset and one or more physical addresses associated with commands of the first subset.

9. The memory system of claim 1, wherein invalidating the one or more logical addresses comprises refraining from rebuilding a mapping between the one or more logical addresses associated with commands of the second subset and one or more physical addresses associated with commands of the second subset.

10. The memory system of claim 1, wherein the one or more controllers are further configured to cause the memory system to:
  rebuild, based at least in part on determining the discontinuity between the respective identifiers of the first subset of the plurality of commands and the second subset of the plurality of commands, a file structure of a host system associated with the memory system.

11. A non-transitory computer-readable medium storing code, the code comprising instructions executable by a processor to:
  receive a plurality of commands each comprising a respective identifier corresponding to an order in which each command of the plurality of commands was generated;
  determine a power on condition of a memory system;
  determine, based at least in part on the power on condition, the plurality of commands performed prior to the power on, each command of the plurality of commands associated with one or more logical addresses and the respective identifier;
  determine a discontinuity between the respective identifiers of a first subset of the plurality of commands and a second subset of the plurality of commands, wherein the identifiers of the first subset are continuous; and
  invalidate the one or more logical addresses associated with commands of the second subset based at least in part on determining the discontinuity.

12. The non-transitory computer-readable medium of claim 11, wherein the instructions are further executable by the processor to:
  receive the plurality of commands from a host system based at least in part on a first sequence, wherein each command of the plurality of commands includes the respective identifier; and
  perform the plurality of commands, wherein determining the power on condition occurs subsequent to performing the plurality of commands.

13. The non-transitory computer-readable medium of claim 12, wherein the instructions are further executable by the processor to:
  store, based at least in part on performing the plurality of commands, an indication of the plurality of commands in a non-volatile storage of the memory system.

14. The non-transitory computer-readable medium of claim 12, wherein the instructions are further executable by the processor to:
  schedule, based at least in part on receiving the plurality of commands, the plurality of commands for execution by the memory system, wherein the scheduling comprises re-ordering the plurality of commands according to a second sequence that is different than the first sequence, including additional commands in the plurality of commands, or both, and wherein performing the plurality of commands is based at least in part on the scheduling.

15. The non-transitory computer-readable medium of claim 11, wherein the instructions are further executable by the processor to:
  store, based at least in part on the discontinuity, the respective identifier of a command of the first subset in a register, wherein the respective identifier of the command indicates a latest command of the first subset.

16. The non-transitory computer-readable medium of claim 15, wherein the instructions are further executable by the processor to:
  receive a command from a host system for an indication of the respective identifier of the command based at least in part on storing the respective identifier; and
  transmit the indication of the identifier to the host system.

17. The non-transitory computer-readable medium of claim 11, wherein each command of the plurality of commands comprises a respective field, the respective field comprising an indication of the respective identifier.

18. The non-transitory computer-readable medium of claim 11, wherein the instructions are further executable by the processor to:
  rebuild, based at least in part on determining the discontinuity, a mapping between one or more logical addresses associated with commands of the first subset and one or more physical addresses associated with commands of the first subset.

19. A method, comprising:
  receiving a plurality of commands each comprising a respective identifier corresponding to an order in which each command of the plurality of commands was generated;
  determining a power on condition of a memory system;
  determining, based at least in part on the power on condition, the plurality of commands performed prior to the power on, each command of the plurality of commands associated with one or more logical addresses and the respective identifier;
  determining a discontinuity between the respective identifiers of a first subset of the plurality of commands and a second subset of the plurality of commands, wherein the identifiers of the first subset are continuous; and invalidating the one or more logical addresses associated with commands of the second subset based at least in part on determining the discontinuity.

20. The method of claim 19, further comprising:

receiving the plurality of commands from a host system based at least in part on a first sequence, wherein each command of the plurality of commands includes the respective identifier; and performing the plurality of commands, wherein determining the power on condition occurs subsequent to performing the plurality of commands.

21. The method of claim 20, further comprising:

storing, based at least in part on performing the plurality of commands, an indication of the plurality of commands in a non-volatile storage of the memory system.

22. The method of claim 20, further comprising:

scheduling, based at least in part on receiving the plurality of commands, the plurality of commands for execution by the memory system, wherein the scheduling comprises re-ordering the plurality of commands according to a second sequence that is different than the first sequence, including additional commands in the plurality of commands, or both, and wherein performing the plurality of commands is based at least in part on the scheduling.

23. The method of claim 19, further comprising:

storing, based at least in part on the discontinuity, the respective identifier of a command of the first subset in a register, wherein the respective identifier of the command indicates a latest command of the first subset.

24. The method of claim 23, further comprising:

receiving a command from a host system for an indication of the respective identifier of the command based at least in part on storing the respective identifier; and transmitting the indication of the identifier to the host system.

25. The method of claim 19, wherein each command of the plurality of commands comprises a respective field, the respective field comprising an indication of the respective identifier.

26. The method of claim 19, further comprising:

rebuilding, based at least in part on determining the discontinuity, a mapping between one or more logical addresses associated with commands of the first subset and one or more physical addresses associated with commands of the first subset.

* * * * *